Feb. 9, 1954   A. G. GRODSON   2,668,724
FASTENING DEVICE
Filed March 18, 1952   2 Sheets-Sheet 1
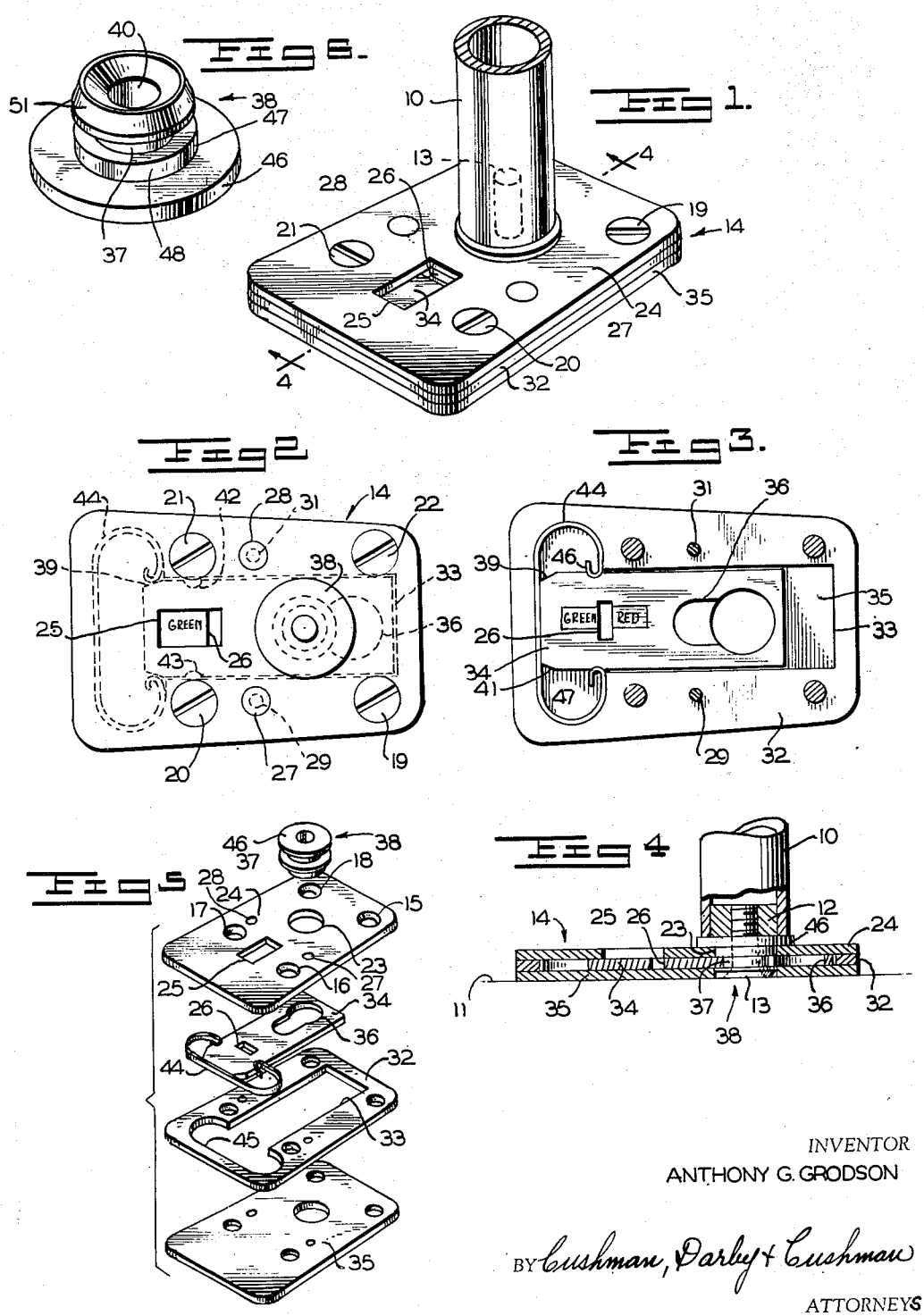
INVENTOR
ANTHONY G. GRODSON
BY Cushman, Darby & Cushman
ATTORNEYS Feb. 9, 1954  A. G. GRODSON  2,668,724
FASTENING DEVICE
Filed March 18, 1952  2 Sheets-Sheet 2
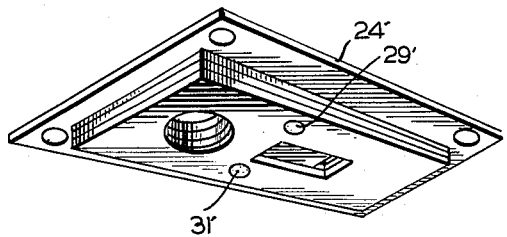
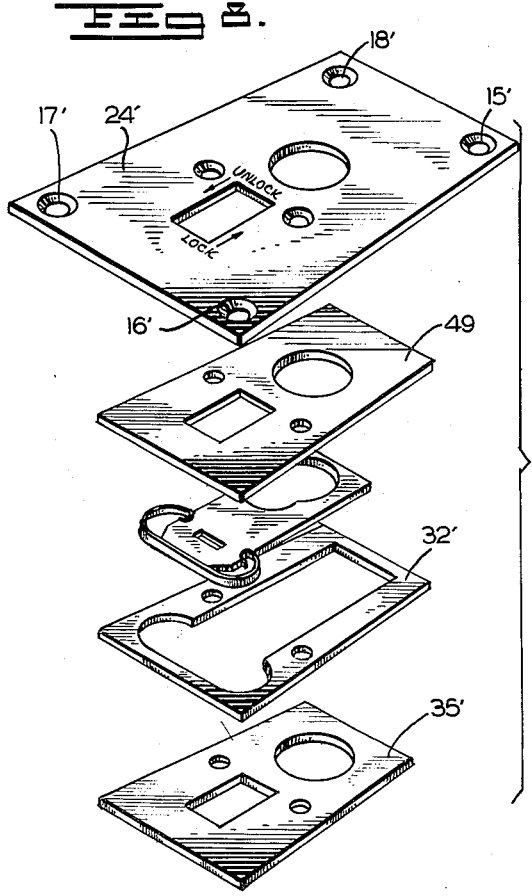
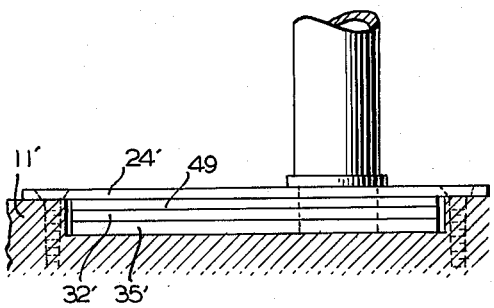
INVENTOR
ANTHONY G. GRODSON
BY Cushman, Darby & Cushman
ATTORNEY Patented Feb. 9, 1954

2,668,724

UNITED STATES PATENT OFFICE 2,668,724

FASTENING DEVICE

Anthony G. Grodson, Miami, Fla., assignor to Aero-Smith, Inc., Miami, Fla., a corporation of Delaware Application March 18, 1952, Serial No. 277,169

9 Claims. (Cl. 287—20)

1

The present invention relates to the art of securing or anchoring one object to a mounting surface or to another object, and is intended for use in aircraft, ships, motor trucks or any other vehicle where it is desirable to prevent shifting or movement of such objects as furniture, equipment, or cargo, for example. However, it will be appreciated from the following description of the present invention that its use is not limited to securing objects in moving vehicles, and that my lock device may be advantageously employed in securing any object to another.

A further object of the invention is to improve the construction of a locking device, adapted to receive a stud or equivalent element to be secured in place; to simplify and reduce the cost of manufacture thereof, and to increase its efficiency.

A further object of the invention is to provide a locking device which includes a stud-receiving receptacle or casing, assembled from simple plate-like stampings, and a shiftable locking element in the form of a simple, flat plate or blade.

Another object is to provide a locking assembly which may be mounted above a supporting surface or in a recess or opening therein, with only an upper plate, of negligible thickness, projecting above or countersunk in the supporting surface.

Still another object is to provide a construction which may be readily changed, to accommodate studs of different lengths, by simply adding or removing one or more shim plates in the superposed assembly or sandwich.

Heretofore various devices intended to perform the functions of the present invention have been proposed, but have not been found to be entirely satisfactory under all conditions of service.

Another object of my invention resides in the provision of a locking device having a longitudinally slidable locking plate which is resiliently urged in its locked and its unlocked positions.

An additional object is the provision of a locking device which occupies a small amount of space, and yet which is capable of supporting large loads.

Still another object of the present invention is the provision of a locking device which includes an indicator window for indicating whether the device is in its locked or unlocked position, and through which an instrument may be inserted for moving the locking plate to either position.

Another object of this invention is to provide a locking device made up in part from a plurality of superposed plates of such design that the

2 simple addition of spacer plates in the assembly adapts the mechanism to receive studs of various grip lengths, thus retaining simplicity of manufacture.

Other objects and many of the attendant advantages of this invention will be readily appreciated as the same becomes better understood by reference to the following detailed description when considered in connection with the accompanying drawings, wherein:

Figure 1 is a perspective view of my invention as applied to anchor the leg of a chair to a floor or other supporting structure;

Figure 2 is a top plan view of the locking device of the present invention with portions thereof underlying the top plate being shown in broken lines;

Figure 3 is a top plan view of my invention similar to Figure 2 except with the top plate and locking stud thereof removed;

Figure 4 is a longitudinal vertical sectional view taken on line 4—4 of Figure 1;

Figure 5 is an exploded perspective view of the locking device in accordance with the present invention, and illustrates the relationship of the various elements thereof with respect to one another;

Figure 6 is a perspective view of the locking stud employed in my invention;

Figure 7 is a perspective view, taken from below, of a modification;

Figure 8 is an exploded perspective view of the modification of Figure 7, and

Figure 9 is a side elevation, showing the locking device recessed or countersunk in the supporting surface.

The present invention differs from the aforementioned prior art devices by the provision of a sliding blade or locking plate having a keyhole slot therein and a C-shaped spring for maintaining the plate in its locked position and in its unlocked position. The present invention possesses certain advantages not possible of attainment in the prior art devices, in that the device herein disclosed employs a design of utmost simplicity and provides a compact structure capable of extremely simple and easy operation with only one moving part. In addition, an indicator window is provided in my invention for indicating whether the device is in the locked or unlocked position.

Referring now to the accompanying drawings, in which like reference numerals are employed to designate like parts, and more particularly, to Figures 1 and 4 thereof, in which reference numeral 10 designates one leg of a chair which is adapted to be secured to a floor or other suitable mounting surface 11, it will be observed that the leg 10 of the chair is provided with a plug 12, which is internally threaded and secured in any manner found convenient at the lower end of the leg. The plug 12 may be either disposed within the lower portion of the leg 10, or it may be secured to the bottom of the leg and serve as an extension thereof. The stud-securing screw 13 is threadably received within the internally threaded aperture of plug 12 to secure the stud 38 to the chair leg.

The stud 38 is adapted to be received by and locked within a receptacle or casing assembly, represented generally at 14 and forming an important part of the locking device of the present invention.

Referring now to Figure 5, it will be noted that the top plate 24 of the locking device 14 is provided with a plurality of countersunk apertures 15—18, adjacent its periphery, and adapted to receive bolts or screws 19—22, for securing the device to a floor, wall or other mounting surface.

Another aperture 23 is provided in the top plate 24, hereinafter referred to as the stress plate, for receiving the locking stud 38, described below. A rectangular window 25 in the stress plate provides an opening through which an indicator may be viewed, to determine whether the locking plate is in its locked or its unlocked position. In addition to serving as an indicator window, aperture 25 also permits insertion of an instrument, such as a screw driver, into a slot 26 provided in the locking plate, more fully described hereinafter, for shifting the same between the locked and unlocked positions. A pair of transversely spaced apertures 27 and 28, in the plate 24 register with similar apertures in the plates therebelow and are adapted to receive pins 29 and 31 which are driven under pressure into these apertures to secure the several plates of the assembly 14 together. It will be appreciated, however, that any other means of securing the elements of the assembly to one another may be employed, if found to be more convenient.

Referring now to Figures 3, 4, and 5, it will be apparent that directly beneath the stress plate 24 is a spacer plate 32 having a keyhole-shaped slot or opening 33 throughout the greater portion of its length for the purpose of slidably receiving the locking plate 34. Beneath the spacer plate 32 is a bearing plate 35. The bearing plate 35 and spacer plate 32 are each provided with apertures adjacent the periphery which register with apertures 15—18 in the stress plate 24 to provide means through which the mounting bolts or screws may extend into the mounting surface for securely anchoring the locking device to the mounting surface. In a similar manner, the bearing plate and spacer plates are provided with a pair of apertures in registry wtih apertures 27 and 28 on the stress plate, whereby the securing pins 29 and 31 may be extended from the top surface of the stress plate to the bottom surface of the bearing plate for rigidly connecting the various elements of the locking device to one another.

The construction may be modified as shown in Figures 7, 8, and 9, wherein only the top or stress plate 24' contains apertures 15'—18' for mounting the locking plate to a floor structure. In this configuration, the spacer plate 32' and bearing plate 35' are smaller than the stress plate and can be recessed or countersunk into the floor 11' leaving only the stress plate remaining above the mounting surface.

Also, shim plates 49, etc., which are similar to bearing plate 35' may be added in the sandwich to increase the effective thickness of the receptacle or housing as a whole, to accommodate studs of various grip lengths. The pins 29' and 31' here again serve to fasten the assembly together.

The longitudinally slidable locking plate 34 is provided at one end thereof with a keyhole slot 36, the walls of which are adapted to be either in disengagement or engagement with the annular groove 37 in the locking stud 38, depending upon whether the locking plate is disposed in its unlocked position or its locked position. Longitudinally spaced from the keyhole slot 36 in the locking plate 34 and adjacent the other end thereof is the rectangular slot 26 which is adapted to receive an instrument, such as a screw driver, for example, inserted through the indicating window 25 of the stress plate for moving the locking plate 34 from one position to another, as hereinbefore described. On the left side of the slot 26, as viewed in Figure 3, for example, is a suitable indicator for informing the operator of the device that the locking plate 34 is in its unlocked position. The indicator on the left side of slot 26 may be viewed through the indicating window 25 in the stress plate 24 when the locking plate has been moved to such a position that the edges of the narrow portion of the keyhole slot 36 are engaged with the walls of the annular groove 37 in the stud 38. Similarly, another indicator may be provided on the opposite side of slot 26 so as to be visible through the indicating window 25 when the locking plate is moved to the release position in which the circular portion of the slot 36 is in registry with the aperture 23 and the edges of the narrow portion are disengaged from the annular groove 37 in the stud 38. Such indicating means may be of any type found convenient for the purpose, such, for example, as green paint on the left side of the slot, to indicate when the locking plate is in its locked position, and red paint on the opposite side of the slot, to indicate when the locking plate 34 is in its unlocked position. Position of the slot 26 in the window 25 also serves to indicate whether the stud is locked or free in the plate. "Lock" and "Unlock" designations may be stamped on the stress plate 24 at either end of the window 25 as shown in Fig. 8.

The end portion of the locking plate 34, which is opposite the end provided with keyhole slot 36, is tapered as shown at 39 and 41. Longitudinally spaced from the tapered portions 39 and 41 are transversely opposed notches 42 and 43, the distance between each notch and the tapered portion adjacent thereto being equal to that distance through which the locking plate 34 is moved when the latter is shifted from its locked position to its unlocked position. A C-shaped spring 44 is snugly received within the transversely enlarged portion 45 of the keyhole slot 33 in the spacer plate 32, in such a manner that the spring ends 46 and 47 are respectively engageable with the tapered portions 39 and 41 when the lock plate is in its locked position, and with the notches 42 and 43 when the locking plate is in its unlocked position.

The locking stud 38, best viewed in Figures 4, 5, and 6 is provided at its upper end with a circular flange 46, which is adapted to rest upon the upper surface of the stress plate 24. A longitudinal bore 40 in the locking stud 38 is adapted to receive the stud securing screw 13. The locking stud 38 includes a shank 47, having a length equal to the combined thickness of the stress plate, spacer plate and bearing plate. The portion 48 of shank 47 is equal in length to the thickness of the stress plate, and is substantially equal in diameter to the diameter of aperture 23 therein. The grooved portion 37 of shank 47 is of the same length as the thickness of the locking plate 34. The bottom of the groove is of a diameter substantially equal to the width of the narrow portion of the keyhole slot 36 in the lock plate. The portion 51 of shank 38 is tapered at its outer extremity to facilitate insertion of the stud bolt into the aperture 23 of the stress plate. In addition, the end surface of portion 51 is countersunk at the end of bore 40 so as to receive the head of the screw 13.

By such an arrangement as that herein described, the flat-headed screw 13 may be inserted through bore 40 of the locking stud 38 and threaded into the internally threaded plug 12, as illustrated in Figures 1 and 4. The locking stud 38 may then be locked to the assembled stress, spacing and bearing plates in the manner hereinbefore described and thereby rigidly lock the chair or other object to the mounting surface.

While the invention has been described with reference to certain preferred examples thereof which give satisfactory results, it will be understood by those skilled in the art to which the invention pertains that various changes and modifications may be made without departing from the spirit and scope of the invention, and it is my intention, therefore, to cover in the appended claims all such changes and modifications.

I claim:

1. A locking device adapted to receive a headed stud, said device comprising a plurality of superimposed plates fixedly secured together, including a top plate having a stud-receiving aperture therein, a spacer plate below the top plate having an elongated opening therein constituting a slideway and terminating at one end in a lateral enlargement, and a bottom plate below the spacer plate; a locking plate having a keyhole-shaped slot therein mounted in the slideway for movement between positions in which the narrow portion of the slot registers with the stud-receiving aperture and in which the circular portion registers therewith, and a spring in said lateral enlargement engageable with the locking plate for holding the same in its two positions.

2. A locking device adapted to receive a headed stud, said device comprising a plurality of superimposed plates fixedly secured together, including a top plate having a stud-receiving aperture therein, a spacer plate below the top plate having an elongated opening therein constituting a slideway and terminating at one end in lateral enlargements, and a bottom plate below the spacer plate; a locking plate having a keyhole-shaped slot therein mounted in the slideway for movement between positions in which the narrow portion of the slot register with the stud-receiving aperture and in which the circular portion registers therewith, and a C-shaped spring disposed at said one end of said slideway with its curved end portion disposed in said enlargements and its free ends engageable with the locking plate for holding the same in its two positions.

3. A locking device adapted to receive a headed stud, said device comprising a plurality of superimposed plates fixedly secured together including a top plate having a stud-receiving aperture and an access window therein, a spacer plate below said top plate having an elongated opening constituting a slideway and terminating at one end in a lateral enlargement, and a bottom plate below the spacer plate; a locking plate having a keyhole-shaped slot therein mounted in the slideway for movement between positions in which the narrow portion of the slot registers with the stud-receiving opening and in which the circular portion registers therewith, said locking plate also having means associated therewith for engagement by an implement inserted through said window for shifting the locking plate, and a spring in said lateral enlargement, engageable with the locking plate for holding the same in its two positions.

4. A locking device for receiving a headed stud, comprising a receptacle formed from a plurality of superimposed plates fixedly secured together and including a top plate having a stud-receiving aperture therein, a spacer plate below the top plate and having an elongated opening constituting a slideway, terminating at one end in a lateral enlargement, and a bottom plate positioned therebelow; a locking plate mounted in the slideway having an edge mounted for movement between a position underlying a portion of the stud-receiving aperture and a position removed therefrom, and a spring in said lateral enlargement engageable with the locking plate for holding the same in its two positions.

5. A locking device for locking two members together comprising a bearing plate, a spacer plate carried on the upper surface of said bearing plate and being provided with a keyhole-shaped slot extending from one end portion of said spacer plate substantially throughout the length of said spacer plate and having the enlarged portion thereof extending transversely across the spacer plate to a greater extent than the width of the other portion thereof, a locking plate slidably carried upon the upper surface of said bearing plate and within said other portion of the keyhole-shaped slot, said locking plate being of shorter length than said other portion of said slot and including interior wall surfaces defining a keyhole-shaped slot adjacent one end thereof and a rectangular slot adjacent the other end thereof, said locking plate further including tapered edge portions at said other end thereof and transversely opposed edge notches positioned inwardly from said tapered edge portions, a C-shaped spring element carried within said enlarged portion of said first mentioned keyhole slot and having the end portions thereof in engagement with said edge notches prior to the connection of the two members to one another and in engagement with said tapered edge portions when the two members are locked together, a stress plate having interior wall surfaces defining a rectangular indicator window overlying the rectangular slot in said locking plate and of a length at least equal to the distance between said tapered edge portions and said edge notches in said lock plate, said stress plate, spacer plate and bearing plate being secured to one another with said lock plate positioned within said other portion of said first mentioned keyhole-shaped slot of said spacer plate and between the upper surface of said bearing plate and the lower surface of said stress plate, said stress plate and said bearing plate being provided with a plurality of mounting apertures respectively in registration with one another, said stress plate and said bearing plate being further provided with registering locking stud receiving apertures, said last named apertures being in registration with and of the same size as the enlarged portion of the keyhole-shaped slot in said lock plate when the end portions of said spring are in engagement with said edge notches in the lock plate.

6. A locking device adapted to receive a headed stud, said device comprising a plurality of superimposed plates fixedly secured together, including a top plate having a stud-receiving aperture therein, at least one shim plate below the top plate having a registering stud-receiving aperture, a spacer plate below the shim plate having an elongated opening constituting a slideway and terminating at one end in lateral enlargements, and a bottom plate below the spacer plate; a locking plate having a keyhole-shaped slot therein mounted in the slideway for movement between positions in which the narrow portion of the slot registers with the stud-receiving apertures and in which the circular portion registers therewith, and a spring in said lateral enlargements, engageable with the locking plate for holding the same in its two positions.

7. A locking device adapted to receive a headed stud, said device comprising a plurality of superimposed plates fixedly secured together, including a top plate having a stud-receiving opening and an access window therein, at least one shim plate below the top plate having a registering stud-receiving opening and window, a spacer plate below the shim plate having an elongated opening constituting a slideway and terminating at one end in lateral enlargements, and a bottom plate below the spacer plate; a locking plate having a keyhole-shaped slot therein mounted in the slideway for movement between positions in which the narrow portion of the slot registers with the stud-receiving openings and in which the circular portion registers therewith, said locking plate also having means associated therewith for engagement by an implement inserted through said windows for shifting the locking plate, and a spring in said lateral enlargements, engageable with the locking plate for holding the same in its two positions.

8. A locking device for receiving a headed stud, adapted to be mounted over an opening or recess in a supporting surface, comprising a receptacle formed from a plurality of superimposed plates fixedly secured together and including a top plate having a stud-receiving aperture therein and means adjacent its edges for securing the plate to said surface, a spacer plate below the top plate, of smaller dimension than the top plate and disposed in said opening or recess and having an elongated opening constituting a slideway, terminating at one end in lateral enlargements, and a bottom plate of substantially the same size as the spacer plate positioned therebelow; a locking plate mounted in the slideway having an edge mounted for movement between a position underlying a portion of the stud receiving aperture and a position removed therefrom, and a spring in said lateral enlargements engageable with the locking plate for holding the same in its two positions.

9. A device in accordance with claim 8 in which said receptacle includes at least one shim plate between the top plate and the spacer plate, to increase the depth of the receptacle as a whole.

ANTHONY G. GRODSON.

References Cited in the file of this patent

UNITED STATES PATENTS

| Number | Name | Date |
|---|---|---|
| 1,549,470 | Egbert | Aug. 11, 1925 |
| 1,937,224 | Gray | Nov. 28, 1933 |
| 2,329,640 | Moeller | Sept. 14, 1943 |
| 2,380,782 | Owens | July 31, 1945 |
| 2,408,547 | Bertschinger | Oct. 1, 1946 |

FOREIGN PATENTS

| Number | Country | Date |
|---|---|---|
| 237,421 | Great Britain | July 30, 1925 |